May 26, 1964    G. F. JOHNSON ETAL    3,134,727
RECOVERY OF DIACETONE ALCOHOL FROM DIACETONE
ALCOHOL METHYL ETHER BY VACUUM DISTILLATION
Filed June 22, 1962
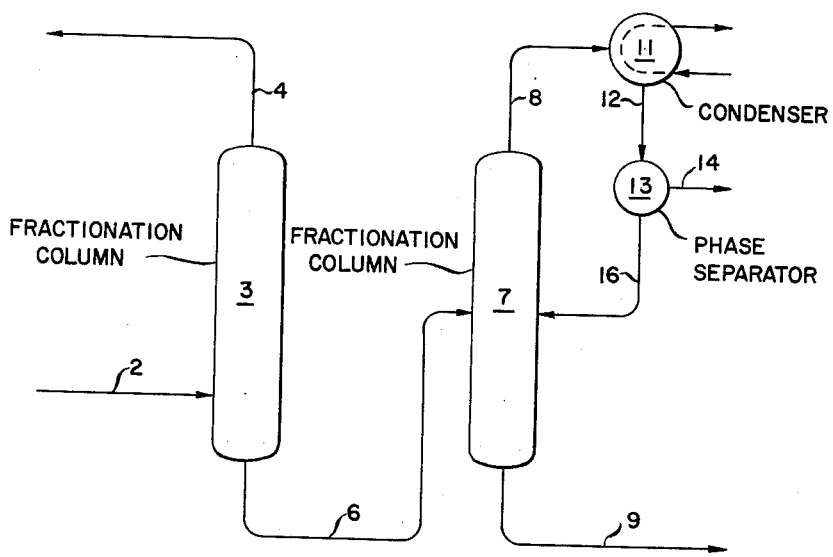
INVENTORS:
GEORGE F. JOHNSON
THOMAS R. MIFFLIN
BY: René D. Zeutner
THEIR ATTORNEY

United States Patent Office 3,134,727
Patented May 26, 1964

3,134,727
RECOVERY OF DIACETONE ALCOHOL FROM DIACETONE ALCOHOL METHYL ETHER BY VACUUM DISTILLATION
George F. Johnson, Baytown, and Thomas R. Mifflin, Pasadena, Tex., assignors to Shell Oil Company, New York, N.Y., a corporation of Delaware
Filed June 22, 1962, Ser. No. 204,336
2 Claims. (Cl. 202—52)

This invention relates to a process for purifying diacetone alcohol. More particularly, it relates to a process for separating the methyl ether of diacetone alcohol from diacetone alcohol.

Introduction

The manufacture of diacetone alcohol and mesityl oxide by heating acetone with methanolic caustic is well known. In that process, however, some diacetone alcohol methyl ether is formed as a by-product of the reaction, by the base-catalyzed condensation of the mesityl oxide with the solvent. Since the diacetone alcohol and its methyl ether have boiling points in the same range—

| Compound: | B.P., 760 mm. Hg |
|---|---|
| Diacetone alcohol | 167.9 |
| Diacetone alcohol methyl ether | 160–161 | separation of the alcohol from the ether impurity is not easy, and a pure diacetone alcohol product can be obtained only with difficulty.

Objects

It is an object of the present invention to provide a process for separating diacetone alcohol from the ethers thereof. Another object of the invention is the provision of a simple and effective process for separating diacetone alcohol from a process stream containing its methyl ether. Another object is the provision of a process for purifying diacetone alcohol which may readily be employed in conjunction with the all-over process for manufacture of diacetone alcohol from acetone by basic condensation, as described above. Other objects will be apparent from the following detailed description of the process of the invention.

Statement of the Invention

These objects are accomplished in the invention by the process which comprises distilling a mixture comprising diacetone alcohol, the ether thereof, mesityl oxide and water; taking off overhead a distillate comprising diacetone alcohol ether, mesityl oxide and water; separating said distillate into an aqueous phase and an organic phase; and returning said aqueous phase to the mixture.

Description of the Invention

The diacetone alcohol product of the instant process is in general that obtained by such methods as are described in U.S. Patent 1,066,474, issued to W. F. Doerflinger on July 8, 1913; and in U.S. Patent 1,844,430, issued to B. N. Lougovoy on February 9, 1932. In such processes, acetone is treated with an alkali metal hydroxide, such as potassium or sodium hydroxide, in methanol or other solvent. Some of the acetone is converted to mesityl oxide and water, and some of the remaining acetone is converted to diacetone alcohol. In the course of such reactions, other products are also produced, of which the most difficult to separate is the methyl ether of diacetone alcohol. Relative amounts of mesityl oxide and diacetone alcohol products obtained are determined by such conventional means of process control as residence time in a given reactor, temperature, caustic concentration, and the like.

After leaving the reactor section of the process, the process stream containing unreacted acetone and the products noted are passed to a recovery section. A typical recovery section is shown in the figure.

The basic process stream is neutralized, conveniently with a mineral acid such as sulfuric acid, phosphoric acid, or hydrochloric acid, or carbon dioxide, and then passed through product line 2 to a first fractionation zone, typically column 3, which may be operated under reduced pressure. In that zone, the light ends, particularly unreacted acetone and methanol solvent, are separated and taken off through overhead line 4 for recycle.

The heavy ends, comprising water, mesityl oxide, diacetone alcohol, ether, and other materials, are taken off through bottoms line 6 and passed to a second fractionation zone, typically column 7, which may be operated at subatmospheric pressure. In the second zone, the light ends are separated overhead through overhead line 8, while the heavy ends are separated through bottoms line 9. The light ends from the second zone comprise water, mesityl oxide and diacetone alcohol methyl ether; while the bottoms consist principally of diacetone alcohol and an unresolved low vapor pressure by-product mixture.

The light ends taken off through overhead line 8 are passed to a condenser 11, where they are condensed. The resulting condensate forms two immiscible phases: an upper organic phase, consisting principally of product with traces of water, and a lower aqueous phase, consisting principally of water with traces of organic products.

The two phases pass through line 12 to a phase separator 13. The upper organic phase is separated through product line 14. The lower aqueous phase is entirely or partially recycled through line 16 to the second fractionation zone 7, where it is introduced either as reflux or in such a manner that it commingles with the heavy ends stream entering zone 7 through bottoms line 6.

Surprisingly, by conducting the process in this manner, the separation of the methyl ether of diacetone alcohol from diacetone alcohol is materially enhanced. The bottoms line 9 then contains principally diacetone alcohol containing only traces of the ether, while the overhead product leaving through product line 14 contains mesityl oxide and diacetone alcohol methyl ether, with only traces of diacetone alcohol. Since mesityl oxide is substantially lower boiling than the diacetone alcohol, the ether may readily be separated from the mesityl oxide in the organic phase by conventional fractionation methods.

In the preferred embodiment of the invention, the feed stream to the second fractionation zone may have a composition varying over a wide range. Such a stream will in general have the following composition.

| Component: | Concentration range, percent w. |
|---|---|
| Water | 5–20 |
| Mesityl oxide | 15–60 |
| Diacetone alcohol | 30–65 |
| Diacetone alcohol methyl ether | 3–12 |

The second fractionation zone may be readily operated at any convenient temperature and pressure. Preferably, it is operated at sub-atmospheric pressure so that the distillation can be accomplished at a relatively low temperature, thus reducing the thermal decomposition of the products. The preferred pressure range for conduct of the distillation is that between about 25 mm. Hg and about 400 mm. Hg, while the optimal pressure is that between 200 and 300 mm. Hg. By operating at subatmospheric pressures, bottoms temperatures from about 150° C., and preferably between about 75° C. and 150° C., may be readily employed.

The vapors taken from the second fractionation zone 7 overhead through line 8 to the condenser 11 are condensed at a temperature such that they revert to liquid phase. The condenser may be conveniently maintained at some temperature between 0° and 85° C. for this purpose. Preferred temperatures in this range are those below about 50° C. By cooling the condenser with lines containing water at ambient temperature, excellent results are obtained. Under such conditions, the condenser is operated at about 20–30° C.

Using the method of the foregoing description, a feed of the following composition—

| Compound: | Percent wt. |
|---|---|
| Acetone | 0.4 |
| Methanol | 0.3 |
| Water | 8.1 |
| Mesityl oxide | 22.2 |
| Diacetone alcohol methyl ether | 8.3 |
| Diacetone alcohol | 57.5 |
| Unresolved heavy ends | 3.3 | was continuously pumped to the 20th tray of a 35-tray 1-inch Oldershaw column. The bottoms pressure was adjusted to 250 mm. Hg absolute and the bottoms temperature was set at 134° C. The overhead vapors were condensed and cooled to 30° C. and a portion of the aqueous layer returned to the column at a rate of 6.2 moles aqueous reflux per mole of total combined organic and aqueous distillate. This reflux rate produced a water content at the top of the column of about 75% w.

Streams obtained by operating under these conditions were as follows.

Bottoms (60% of feed stream):

| Compound— | Percent w. |
|---|---|
| Mesityl oxide | 0.1 |
| Diacetone alcohol methyl ether | 0.4 |
| Diacetone alcohol | 94.8 |
| Heavy ends | 4.7 |

Organic distillate layer (32% of feed stream):

| Compound— | Percent w. |
|---|---|
| Water | 5.1 |
| Mesityl oxide | 64.6 |
| Diacetone alcohol methyl ether | 23.5 |
| Diacetone alcohol | 3.1 |

Organic distillate layer (32% of feed stream):—Continued

| Compound— | Percent w. |
|---|---|
| Heavy ends | 2.0 |
| Methanol | 0.3 |
| Acetone | 1.4 |

Aqueous distillate layer (8% of feed stream):

| Compound— | Percent w. |
|---|---|
| Water | 89.8 |
| Mesityl oxide | 2.0 |
| Diacetone alcohol methyl ether | 3.5 |
| Diacetone alcohol | 2.1 |
| Methanol | 1.7 |
| Acetone | 0.9 |

It will be seen from these data that the bottoms stream is readily treated to afford diacetone alcohol product of over 99% purity. Since the aqueous layer contains only traces of organic materials, it need not be recycled for recovery. The organic layer is easily separated to recover the mesityl oxide product, and the diacetone alcohol-methyl ether stream may be recycled to the reactor for conversion of the methyl ether to diacetone alcohol or mesityl oxide. Alternatively, the stream may be processed further, as by distillation, to recover the methyl ether, the ether being in itself a useful solvent for coating applications.

We claim as our invention:

1. A process for fractionating a product stream from the manufacture of diacetone alcohol from acetone in methanol from which excess methanol and acetone have been removed by distillation leaving a product stream mixture of 5–20% by weight of water, 16–60% by weight of mesityl oxide, 30–65% by weight of diacetone alcohol, 3–12% by weight of diacetone alcohol methyl ether and unresolved heavy ends, which process comprises distilling the product stream mixture at a pressure between 25 mm. Hg and 400 mm. Hg and at a temperature between 75° C. and 150° C. to produce an overhead condensate essentially of water, mesityl oxide and diacetone methyl ether, phase separating said overhead condensate into an aqueous phase and an organic phase, returning said aqueous phase to said mixture at a reflux rate sufficient to maintain a water content in the top of the distilling column of about 75% by weight, and withdrawing the diacetone alcohol as liquid from a lower section of said distilling column.

2. A process according to claim 1 wherein the reflux ratio at which the aqueous phase is returned to the column is at a rate of 6.2 mols aqueous reflux per mol of total combined organic and aqueous condensate.

References Cited in the file of this patent

UNITED STATES PATENTS

| 1,066,474 | Doerflinger | July 8, 1913 |
| 1,937,272 | Guinot | Nov. 28, 1933 |
| 2,130,592 | McAllister et al. | Sept. 20, 1938 |
| 2,635,992 | Carlson et al. | Apr. 21, 1953 |